(12) United States Patent
Kallestad

(10) Patent No.: US 7,240,029 B2
(45) Date of Patent: Jul. 3, 2007

(54) GRAIN AERATION SYSTEMS AND TECHNIQUES

(75) Inventor: Daniel Kallestad, Chino Hills, CA (US)

(73) Assignee: Cerys Systems, Inc., Chino, CA (US)

( * ) Notice: Subject to any disclaimer, the term of this patent is extended or adjusted under 35 U.S.C. 154(b) by 0 days.

(21) Appl. No.: 11/303,518

(22) Filed: Dec. 16, 2005

(65) Prior Publication Data

US 2006/0111035 A1 May 25, 2006

(51) Int. Cl.
*G06F 17/60* (2006.01)
*G06F 11/00* (2006.01)

(52) U.S. Cl. .............. 705/34; 705/30; 705/22; 702/188

(58) Field of Classification Search .......... 705/34, 705/30, 1, 5, 22, 24; 702/188, 187, 128
See application file for complete search history.

(56) References Cited

U.S. PATENT DOCUMENTS 5,946,660 A * 8/1999 McCarty et al. ............ 705/5

\* cited by examiner

*Primary Examiner*—Chen Wen Jiang
(74) *Attorney, Agent, or Firm*—Merchant & Gould P.C.; Ryan T. Grace

(57) ABSTRACT

In one embodiment, the invention is directed toward a networked grain aeration control system. For example, the system can provide centralized monitoring of the aeration of a number of grain storage facilities, thereby improving the management of stored grain. The networked grain aeration control system can allow the custodian of the system to offer an aeration service. Farmers, or other individuals, cooperatives, or companies can purchase the aeration service at a cost proportionate to the amount of stored grain to be aerated and the duration of storage. In this manner, the purchaser of the aeration service can avoid relatively high fixed costs that can be associated with various aeration hardware.

20 Claims, 12 Drawing Sheets

GRAIN AERATION SYSTEMS AND TECHNIQUES

This application claims the benefit under 35 U.S.C. § 120 of application Ser. No. 10/217,312, filed Aug. 8, 2002, now U.S. Pat. No. 7,004,401 which claims the benefit of U.S. Provisional Application 60/311,752 filed Aug. 10, 2001.

FIELD

The invention relates to the agricultural industry and, more particularly, to aeration systems for stored grain or other crops.

BACKGROUND

Agricultural crops, such as harvested grain, are often stored in grain storage facilities, such as grain bins, which are usually clustered at various geographic sites. For example, individual farmers, cooperatives, or corporations often store grain after the grain is harvested in hopes that the market price will increase. In addition, purchasers often store the grain for periods of time, prior to milling, shelling, or other processing of the grain.

Aeration systems and techniques have been developed to aerate stored grain with the primary purpose of preventing spoilage from insect and microbial activity. In addition, aeration can be used to achieve or approach a desired temperature and/or a desired moisture content for stored grain to increase its usability. Aeration can maintain, and in some cases, improve the quality of stored grain by achieving specified targets for temperature and moisture content, allowing sellers to receive higher prices for the grain, and allowing purchasers to maintain or improve the quality of grain that was purchased.

SUMMARY

In one embodiment, the invention is directed to a networked grain aeration control system. For example, the system can provide centralized high-level control and logging capabilities for the aeration of a number of grain storage facilities located at a number of different sites, thereby improving the management of stored grain. A networked grain aeration control system enables the custodian of the system to offer an aeration service to multiple grain storage customers. Using the networked grain aeration control system, the custodian can provide customized configurations and strategies for a local controller from a centralized remote location, as well as log aeration operation and other information such as weather data originating at different sites.

Farmers, or other agricultural producers, cooperatives, or companies can purchase the aeration service at a cost proportionate to the amount of stored grain to be aerated and the duration of storage. In this manner, the purchaser of the aeration service can avoid the fixed costs associated with stand-alone controllers. In addition, the seller of the service can regulate and meter the usage of the grain aeration technology.

In one embodiment, a networked grain aeration system includes a first controller coupled to a first sensor and a first aeration fan positioned in proximity to a first agricultural crop storage facility located at a first site, wherein the first controller controls the operation of the first aeration fan according to conditions sensed by the first sensor. The first sensor may be one of a first set of sensors coupled to the first controller located at the first site. In that case, the first controller can control the operation of the first aeration fan, and possibly additional fans positioned in proximity to additional crop storage facilities at the first site according to conditions sensed by the first set of sensors. The first controller provides tailored control to the first fan so the grain in the first facility is managed independently of other facilities at the site.

The system may also include a second controller coupled to a second sensor and a second aeration fan positioned in proximity to a second agricultural crop storage facility located at a second site, wherein the second controller controls the operation of the second aeration fan, and possibly additional fans positioned in proximity to additional crop storage facilities at a second site according to conditions sensed by the second sensor. The second sensor may be one of a second set of sensors coupled to the second controller located at the second site. Each facility at the second site can be managed independently of other facilities at the second site and other facilities at other sites. The system may also include a central computer communicatively coupled to the first and second controllers, wherein the central computer oversees, monitors and records operational data relating to the aeration at both the first and second agricultural crop storage facilities. In particular, the central computer may log a history of sensed conditions, run time of the aeration fans, sensed conditions during the run times, and possibly other operational parameters used by the controllers.

The central computer may provide tailored configurations and strategies on a timely basis to the first and second controllers to improve the performance of the local controllers. Although instructions to each controller may be generated specifically with the grain in the respective facility in mind, the accumulated experience from all facilities at all sites may be considered to refine control parameters and strategies delivered to each facility.

The first and second sensors may be temperature sensors, relative humidity sensors, barometric sensors, or sensors having some combination of temperature, barometric, and relative humidity sensing functionality, although the invention is not necessarily limited in those respects. The respective controllers can use conditions sensed by each of the sensors to identify appropriate run times for the aeration fans. In some cases, multiple (redundant) sensors are used by each respective aeration controller. In that case, diagnostic steps may be performed to assure the sensed values are valid or to provide continued operation when one sensor may fail.

The agricultural crop storage facilities may be grain storage bins or other structures such as silos, bunkers, flat storages, or tanks. The central computer can be communicatively coupled to the first and second controllers located at the first and second sites respectively via a network, such as a packet based local area network, wide area network, or global network such as the Internet, or a public switching telephone network (PSTN). The communication links may be wired or wireless. In some instances, a site may be segregated into two or more subsets, each with a local controller that operates independently of each other. Each local controller may be communicatively linked to the central computer to accommodate a number of circumstances. These circumstances may include local network interferences, physical barriers such as railroad tracks, and electrical power distribution that may come from more than one source.

The central computer may receive cumulative data from each local controller, and can parse, validate, store, and possibly organize data including data sensed by the various sensors. For example, weather information can be a valuable commodity that is gathered by the various sensors, particularly when a large number of sensors are geographically distributed. This weather data may be sold and/or used, for example, to improve weather prediction or even improve the ability to identify storm warnings such as tornado warnings. In addition, information relating to the operation time of the various fans can also be collected and stored by the central computer to help monitor system operation. The central computer may create records that represent, for example, an aeration history for a particular lot of grain. These records could provide assurance as to the conditions the grain experienced during the entire period from harvest to consumption. For instance, these records could reflect whether or not a condensing situation occurred that might foster insect or microbial activity occurred during the span of storage. Recorded operational parameters can be used to document the aeration of a lot of grain, and may provide useful backup that can be downloaded to a replacement controller, e.g., in the event of controller malfunction, destruction, or failure.

One or more client computers may also be communicatively coupled to the central computer. For example, farmers or other purchasers of the aeration service may use client computers to access information relating to their grain and the aeration service provided for that grain, e.g., via a web browser interface. Each individual client computer may have access only to the data that pertains to that particular client, i.e., the purchaser of the service. In other words, a first client computer may not have access to data pertaining to a second agricultural crop storage facility, and likewise, the second client computer may not have access to data pertaining to the first agricultural crop storage facility. Password protection and/or other security and authentication methods may be used to enable specific data delivery to the respective client computers.

The system may utilize one or more algorithms to ensure that aeration is performed at the desired times and under the appropriate circumstances. As one example, the present inventor has developed methods for aeration of stored grain as described in U.S. Pat. Nos. 4,688,332 and 4,522,335, which are hereby incorporated by reference in their entireties. Improvements on the methods of the aforementioned patents, however, can also be implemented. For example, an aeration method may take into account other variables, in addition to ambient conditions to achieve better aeration results. Also, improvements to the techniques described in the above-identified patents may also be used, such as truncation of temperature bands or relative humidity bands for improved results in certain climates. In some cases, the truncation can be performed dynamically based on sensed data during recent accumulation of fan operation or a climate history during past seasons. Such improvements are described in greater detail below. The functions of the aforementioned patents and improvements to them can be executed at the local controllers to provide real-time capability. The central computer can download configuration files or other instructions from time to time in response to accumulated data from each local controller so personnel employed for other duties at a grain storage site do not have to be skilled in grain aeration management.

Another variable that could be taken into account in a networked aeration system, or even in a more conventional non-networked grain aeration unit, is heat produced by the aeration fan itself. For example, aeration fans can give off heat from the motor, and more notably, aeration fans may generate significant amounts of heat via friction between the fan blades and the air. An aeration method or algorithm according to the invention may account for heat produced by operation of the aeration fan to yield better aeration results.

In one case, an aeration method makes an adjustment to sensed conditions to account for fan size and the size of the grain storage facility. For example, given the fan size and the size of the grain storage facility and its current contents, a theoretical offset of sensed ambient temperature could be calculated. In other words, the offset can represent the difference between the ambient air temperature and the temperature of the air after it has passed through the aeration fan. Accordingly, the offset can account for heat produced by the fan, and can be used to more accurately select appropriate ambient air to force through the grain so various targets may be achieved.

If used to modify the adaptive algorithm incorporated in the aforementioned patents, this offset would have the effect of shifting the starting point for a series of calculations to establish ranges of acceptable ambient conditions for current aeration. This modification to the targeted temperature (the ambient air average temperature or such adjusted) could be accomplished by subtracting the calculated offset from such targeted temperature. In turn, the sensed ambient relative humidity would need to be adjusted using psychometric formulas to adjust for the raised temperature. This method may be used in positive pressure aeration systems and not in negative pressure aeration systems.

Additionally, the method may account for static pressure within the facility, e.g., at the location of an aeration fan or after the fan and prior to air entry into the grain. For example, the amount of static pressure may be related to how full the facility is, relative to its capacity. Because the amount of grain in a facility may change often, by accounting for static pressure, a better approximation of the offset can be achieved because the heat generated from the friction on the fan blade may be higher if static pressure is higher and may be lower if static pressure is lower. If a static pressure sensor were employed, the offset utilized in the above method could be calculated directly rather than theoretically.

In one particular case, which can be used in positive pressure aeration systems, a feedback sensor, e.g., a feedback node (f-Node), is used to measure the actual temperature and/or relative humidity (RH) of air after it has gone through the fan. The use of the f-node can achieve an actual measurement of the temperature offset and/or RH offset caused by the operation of the aeration fan. The measured offset can then be used as feedback to the aeration controller. The aeration controller can then control the operation of the fans accordingly, accounting for both ambient conditions and the offset of air conditions relative to the ambient conditions caused by fan operation. In general, ambient air with lower temperature and a higher relative humidity would need to be selected by the controller to achieve the desired targets since heating air lowers relative humidity.

In accordance with the principles of the invention, a central computer may log the data received from the f-node to supplement the record from other sensors to improve the reliability of modeling the conditions within the storage facility over a span of time. For example, this data could be used to demonstrate that the grain stored inside the storage facility was never exposed to conditions favorable for insect activity or the growth of microbes including fungus that can produce mycotoxins, allergens, or other conditions that may result in grain contamination. The documentation could increase the value of the grain and justify the added cost of an f-node sensor because of increased confidence in the safety of the grain, whether intended for human or animal consumption.

Another improvement to grain aeration management that can be provided by a networked system is electricity conservation and cost reduction. With a networked system, contracts may be negotiated with suppliers of power to grain storage operations to shed certain loads in high demand periods in order to obtain lower rates. The total horsepower of aeration fans deployed at a grain storage site on one or more facilities may range from just a few to several hundred, to more than a thousand. The total in the USA is estimated at 7,000,000 horsepower. Since a fan should not be turned off with certain conditions existing in the grain, load interruption can only be accomplished with full knowledge of the state of each grain facility or loss may result. However, conventional aeration fans are often operated manually more than necessary to be on the safe side because of a lack of information and skill regarding aeration practice.

A networked system could provide the necessary expertise to make that decision and to communicate with various power companies in real time regarding their current load factor. If need be, the networked aeration system could accommodate requests for short duration shutdowns of operating fans to relieve power suppliers during peak demand periods. A networked system may have sufficient information and expertise to safely manage fan operation around the competing goals of preventing spoilage, modifying moisture content, and economizing on electricity consumption, especially at certain times. In addition, a load queuing scheme may be employed at each grain storage site so the total horsepower of the fans in operation at one time does not exceed specific levels for that site, or while certain other high load demands may be in use. Any such implementation may balance the respective considerations of the condition of the grain, the targets set for the grain, the weather and season and the cost of electricity and the extra charges of exceeding a specified demand.

The invention can provide a number of advantages. For example, improved aeration techniques can assure minimum or no deterioration, and may actually improve the quality of stored grain. Indeed, aeration can help ensure that fungus producing mycotoxins, some of which can be carcinogenic, cannot live or flourish in the aerated grain. At a minimum, the aeration can ensure that mycotoxin levels, allergen levels and other contaminate levels do not increase during storage, and therefore, can help ensure that contaminant levels within the stored grain are kept below acceptable levels.

Acceptable levels of contaminants, however, may correlate to smaller and smaller amounts of contaminants per unit of grain as research on the effects of contaminants continues to advance. In addition, aeration can be effective in avoiding the loss of all of the grain in a facility to spoilage, the spoiling of a portion of grain with the resulting contamination of unspoiled portions of grain within a facility due to mixing when removing the contents, preserving grain weight by eliminating the typical shrink due to moisture loss with manual operation of aeration, minimizing insect infestation, achieving targeted moisture content levels, achieving uniformity of kernel to kernel moisture content, re-hydrating of over-dry grain, and drying of over-wet grain within the limits of airflow availability. In addition, with grain storage facilities with adequate aeration systems that are appropriately managed, upstream practices of high heat drying may be eliminated or modified. This reduction in harsh treatment of grain can reduce stress cracks and the subsequent breakage during handling as well as evaporation of certain volatiles from the grain. The entire network system can work toward generally preserving and possibly improving the quality of stored grain. For these reasons, precisely managed and controlled aeration may become an integral part of future grain storage.

Networked grain aeration also provides advantages in terms of accessibility of the data that is accumulated. For example, purchasers of the aeration service may be able to access data from remote computers connected to the Internet. In other words, farmers can have access to data that shows them results of the service they are receiving. In particular, farmers, or others can have access to data that tracks the conditions surrounding the stored grain, and the various aeration measures taken on that grain. Such data can provide a history of stored grain, allowing for trace ability and improved accountability of the stored grain. Even a chain of custody may be established and documented, in some cases, allowing the custodian of the grain to provide assurances of safety.

In one implementation of the invention, a chain of custody is automatically documented in the centralized computer of the networked aeration system. The documentation can even be uploaded from the local controller or downloaded from the central server, for example, to delivery vehicles, when the stored grain is moved from a given storage facility. For example, purchasers of the grain may desire information describing the history of a particular lot of grain being purchased. By allowing this information to be uploaded from computers at the storage facility to accompany the grain during transportation or to be available by other means at the point of delivery, verification for proper segregation at the next point of delivery may be enabled. In addition, if the grain merchandiser (such as a country elevator) also subscribes to the networked aeration service, he not only has assurance of the quality of a lot of grain before co-mingling with other lots of grain, but he can segregate lots of grain according to very high resolution factors not previously available. Additionally, the grain merchandiser could schedule deliveries originating from many different producers to a certain destination at a given time to assemble larger lots of grain with highly consistent attributes that best meet his customer's needs.

Purchasers of grain and the end user (the public) can be more readily assured of the safety of the purchased grain or products processed from grain or meat, milk, and eggs from livestock because of the detailed records and chain of custody enabled with a networked aeration system.

Centralized control and monitoring can also improve the level of aeration quality, allowing the provider of the aeration service to centrally monitor whether the individual aeration units are working properly. Another advantage of networked grain aeration includes the ability to provide more effective control of aeration in various geographically distributed grain storage units. In other words, instead of a local grain storage manager controlling aeration as he or she sees fit, centralized expertise can be used to monitor and more effectively control aeration. In addition, if device failure occurs, centralized record keeping can allow information relating to recent climate and aeration fan operation to be downloaded to a new controller that may be installed following failure of a previous controller.

Networked grain aeration may also allow for a new and inventive pricing arrangement that can be attractive to prospective purchasers. In one embodiment, the invention may comprise a method that includes monitoring aeration fans positioned in remotely located agricultural crop storage facilities via a central computer of a networked grain aeration system, and charging fees related to an amount of grain and/or a span of time it is being stored in any given agricultural crop storage facility.

Farmers, cooperatives or other individuals or companies that are prospective purchasers of aeration control systems may be reluctant to invest in aeration control hardware. For example, farmers may not want to spend the fixed costs, given the unknowns associated with weather and crop yield for any given year as well as marketing decisions. The invention can allow the seller of aeration control service to bear the fixed cost, and sell the aeration service at costs related to the amount of aeration service that is actually utilized. In this manner, the charge for the aeration service may reflect the amount of grain being aerated, and the time for which the grain is actually stored and aerated, which may vary. This method also overcomes a "free-rider" problem, wherein a purchaser of an aeration unit for a small storage facility uses the aeration unit in a much larger facility or for multiple facilities. Such applications lower initial investments, but deliver overall results that are deficient from those expected from a robust system.

In another method, the invention may include monitoring aeration fans positioned in remotely located agricultural crop storage facilities via a central computer of a networked grain aeration system and selling grain spoilage insurance for an amount of grain being stored in any given agricultural crop storage facility. Networked grain aeration can facilitate the ability to guarantee against grain spoilage. Farmers may be able to take out loans from a bank, based on the amount of harvested crops the farmer owns but has not yet sold. However, the banks may desire, or even require the grain spoilage insurance to protect their investments. The seller of aeration services, utilizing networked grain aeration having centralized control, may be able to provide this insurance because the centralized control allows the seller of the service to adequately manage against grain spoilage and thereby protect the grain assets and keep premiums affordable. Currently, grain storage operations are burdened with the entire risk of spoilage, since no insurance is available because of the difficulty of determining appropriate and affordable premiums due to the haphazard methods of current grain storage practice and lack of record keeping.

Additional details of these and other embodiments are set forth in the accompanying drawings and the description below. Other features, objects and advantages will become apparent from the description and drawings, and from the claims.

DETAILED DESCRIPTION

The invention is directed to a networked grain aeration control system, various grain aeration techniques, pricing schemes for a grain aeration service, and other techniques that can improve grain aeration and the aeration service. Using the system and/or techniques can improve the usefulness of stored grain. In this disclosure, the term grain refers broadly to any harvested crop of seeds, including rough and small grains, maize, legumes, pulses or any other harvested agricultural crop that is customarily stored in bulk and that can benefit from aeration.

Figure 1:
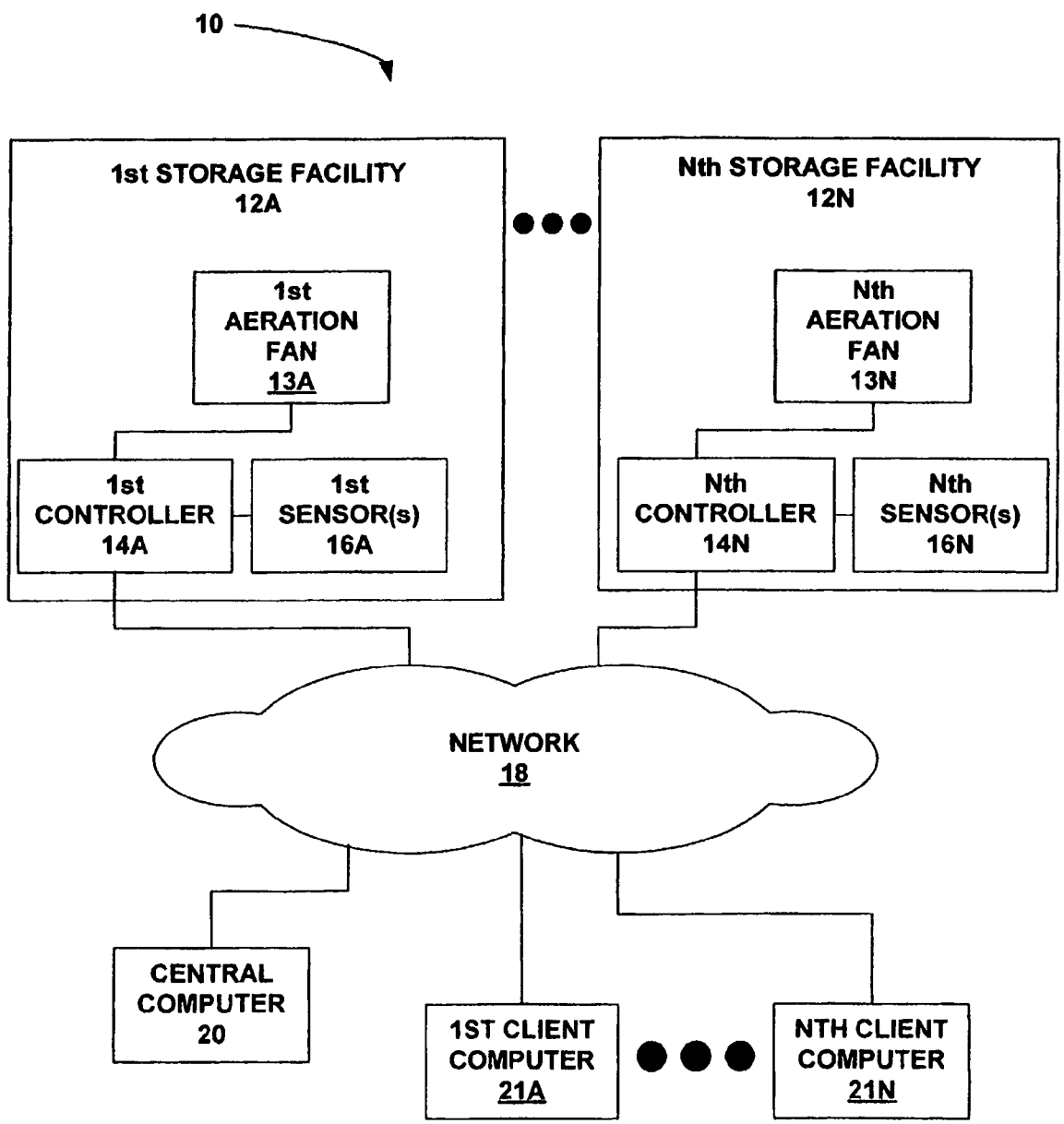
FIG. 1 is a block diagram of an exemplary networked grain aeration system.

FIG. 1 is a block diagram of an exemplary networked grain aeration system 10. For example, system 10 can provide centralized control, monitoring and/or historical logs of the aeration of grain in a number of grain storage facilities 12. Any number of grain storage facilities may be included in system 10. However, for simplicity, only two facilities 12A and 12N are illustrated in FIG. 1. System 10 may improve the ability to manage the aeration of stored grain. Moreover, networked grain aeration system 10 can allow the custodian of the system 10 to offer an aeration service to multiple grain storage facilities via unique pricing arrangements.

As shown in FIG. 1, networked grain aeration system 10 includes two or more grain storage facilities 12. Each grain storage facility 12 can be equipped with an aeration fan 13 that is controlled by a respective aeration controller 14. For example, each aeration controller 14 may comprise a computer controller that causes the respective aeration fan 13 to turn on at times when effective aeration can occur. For example, aeration controller may control aeration fan 13 by invoking a control node as described below with reference to FIG. 3. In any case, one or more sensors 16 may be coupled to each respective aeration controller 14 to provide measurements of ambient conditions and measurements associated with the stored grain. The measured conditions may be used by aeration controller 14 to determine when to turn on the respective aeration fan 13.

Sensors 16, for example, may include temperature sensors and relative humidity sensors. Separate temperature and relative humidity sensors may be used at each storage facility 12, or a sensor having both temperature and relative humidity sensing capabilities can be used. In addition, various other sensors such as temperature sensors positioned to measure the temperature of the stored grain, sensors to measure barometric pressure, sensors to measure static pressure within the storage facility, or feedback sensors that account for heat produced by the operation of aeration fans 13 may also be used. Additional details of these and other sensors are provided in greater detail below. In any case, aeration controller 14 controls aeration fans 13 based on sensed conditions and various input parameters to achieve a desired temperature and moisture content of the stored grain, with or without a deadline.

For example, aeration controller 14 may execute one or more aeration techniques such as those described in U.S. Pat. Nos. 4,688,332 and 4,522,335. U.S. Pat. Nos. 4,688,332 and 4,522,335 are incorporated by reference in their entireties. In particular, aeration controller 14 may receive input specifying a desired moisture content for the stored grain. The controller may calculate a desired temperature best for that geographic location, or such desired temperature may be modified by input in specific cases. Aeration controller 14 may define a temperature band and a relative humidity band respectively around the desired temperature and a relative humidity that corresponds to the desired moisture content for a given temperature. For example, if the desired temperature is 48 degrees Fahrenheit, aeration controller 14 may define a temperature band of +/−2 degrees, i.e., 46 degrees to 50 degrees. Similarly, aeration controller 14 may define a relative humidity band of +/−2 percent.

The temperature band may depend on beginning grain temperature, or may simply be a band defined about a target temperature determined in another method for the grain. In one example, the target temperature is determined by an average temperature over a span of time, e.g., in one useful case, a twenty-one day moving average of ambient temperature. Aerating grain at or near its current temperature can help avoid moisture migration in the stored grain. In other cases, the target temperature can be offset to account for heat produced by aeration fan 13, barometric pressure, extreme climate fluctuations, or other variables. In addition, the target temperature may be dependent on the specific type of grain to be aerated. Moreover, different target temperatures may be selected based on whether re-wetting or drying is desirable. The target temperature may also be offset from the average during extremely hot or extremely cold conditions or even in seasonal cases. The target temperature may also be adjusted to prepare the grain for readiness for shipping if the destination is known or the grain will be transported through a different climate. As an example, transporting cold grain through a tropical region by ship can result in severe condensation that encourages spoilage. Accordingly, in that case, the grain may be warmed prior to transport.

The target relative humidity for a desired moisture content may be temperature dependent and may also depend on the current temperature of the grain. In addition, measurements of barometric pressure may be used to adjust the target relative humidity for a given temperature. Also, the target relative humidity may be dependent on the specific type of grain to be aerated. Moreover, a different target relative humidity for a given moisture content may be selected based on whether re-wetting or drying is to occur. The size of the bands may vary in different implementations.

If sensor 16 identifies an ambient temperature within the temperature band, say 47 degrees Fahrenheit, aeration controller 14 identifies the target relative humidity associated with the sensed 47 degree temperature, e.g., 63 percent. In other words, the target relative humidity may depend on the current ambient temperature, and furthermore, may also depend on the current temperature of the grain. In any case, at 47 degrees, for example, if the ambient relative humidity is within the relative humidity band of say 61 percent to 65 percent (+/−2 percent of 63 percent), then aeration controller 14 may activate aeration fan 13. Larger or smaller bands could also be defined. In addition, barometric pressure readings or other climate conditions could be used. In that case, aeration may occur only when the conditions surrounding storage facility 12 fall within the defined climate conditions. Also, climate conditions, such as barometric pressure, for example, may be used to adjust the temperature and/or relative humidity targets and bands.

Aeration controller 14 may also have a regulator-like mechanism that ensures that the aeration fan 13 can only run for an allotted amount of time, on average, in order to conserve power. For example, aeration controller 14 may budget an amount of time for a given time interval, e.g., four hours per day. In that case, aeration controller 14 would activate aeration fan 13 for only four hours per day on average, even if the desired conditions of temperature and relative humidity were present for more than four hours per day.

Aeration controller 14 may also accumulate a backlog of time to account for unused time that was budgeted for aeration. Thus, if the desired conditions were not present for two days, then twelve hours of accumulated budget may be used on the third day. In other words, the four hour budgets for three days may accumulate to twelve hours, which can be used in succession once the desired conditions occur. Once the accumulation of budgeted time is used, however, aeration fan 13 may be turned off even if the desired conditions are still present.

In addition, aeration controller 14 may define a backlog threshold, say twenty hours (the equivalent of five days at four hours of budget per day). If the backlog exceeds the threshold, aeration controller 14 may enlarge the temperature and/or relative humidity bands to improve the likelihood that aeration will occur. This can help ensure that at least some aeration occurs even if the ambient conditions are sub-optimal. The temperature and/or relative humidity bands may return to the originally defined values once the backlog does not exceed the threshold, or alternatively, the changed temperature and/or relative humidity bands may be used for longer periods of time once the change is invoked.

One extremely useful improvement to these aeration techniques may involve the truncation of the temperature and/or relative humidity bands to improve aeration for climate specific scenarios. In particular, aeration controller 14 may truncate the temperature and/or relative humidity bands for different climate scenarios in a manner that causes aeration to achieve improved results in terms of more accurately achieving a target temperature and/or moisture content for the stored grain.

For example, assuming a target temperature of 48 degrees and a target relative humidity of 63 percent, in drier climates if a symmetric relative humidity band is defined around the target humidity, e.g., +/−2 percent of 63 percent relative humidity, it will be likely that on average the aeration fan 13 will be activated during times of relative humidity in the lower half of the humidity band, e.g., at relative humidity between 61 and 63 percent. In that case, the actual temperature and/or moisture content of the grain will be skewed away from the target on the dry side, which is undesirable.

For this reason, aeration controller 14 may truncate the humidity band for dryer climates, such that for example, if the target relative humidity is 63 percent, then the relative humidity band can be defined to be −1, +3 of that value, i.e., 62 to 66 percent. In other words, the humidity band can be made non-symmetric about the target humidity. In particular, for dry climates, the relative humidity band around the target relative humidity can be truncated to increase the wet side of the band relative to the dry side of the band. Such techniques can greatly improve aeration in extreme climates. Drier climates may be more likely to have a temperature of 48 degrees and a relative humidity below the target of 63 percent. Truncating the humidity band to account for such climate-specific phenomena can improve the quality of aeration, thereby creating a greater likelihood of achieving the actual target moisture content for the grain. Moreover, truncation can be particularly helpful to compensate for micro-climate phenomena, such as local climate effects of lakes, rivers, forests, or the like.

Truncation may occur automatically at aeration controller 14, based on measured climate conditions during previous aeration. In other words, band truncation can be an adaptive feature implemented by aeration controller 14. For example, aeration controller 14 may truncate the humidity band to the wet side, based on measured dry conditions during earlier operation of aeration fan 13, or may truncate the humidity band to the dry side, based on measured wet conditions during earlier operation of aeration fan 13. Alternatively, truncation may occur via programmed variables submitted by an aeration expert at central computer 20, which is described in greater detail below. In any case, the extent of extreme climate conditions required to initiate an adaptive truncation of the humidity band is subject to a wide variety of implementation-specific values.

The truncation feature may also be incorporated to improve aeration in wetter climates. In that case, aeration controller 14 may truncate the humidity band for wetter climates, such that for example, if the target relative humidity is 63 percent, then the relative humidity band can be defined to be −3, +1 of that value, i.e., 60 to 64 percent. In other words, for wet climates, the relative humidity band around the target relative humidity can be truncated to increase the dry side of the band relative to the wet side of the band.

Aeration controller 14 may be programmed to initially truncate the temperature or relative humidity bands, or may be programmed to only truncate the bands in response to a band adjustment event, such as when the backlog exceeds the backlog threshold. Moreover, aeration controller 14 may receive feedback of the conditions during which aeration fan 13 has operated, and may adjust and truncate the band(s) based on the previous conditions in order to more adequately achieve the target temperature and moisture content for the stored grain. In any case, improved aeration can be achieved in a climate specific manner. The level of truncation may vary in different implementations. Adaptive truncation may provide responsive adaptation of the aeration, which can improve aeration in extreme climates, and can adjust for microclimate fluctuations as they occur.

In accordance with the principles of the invention, system 10 also includes a central computer 20 that may define or control the operation specific parameters of the respective aeration controllers 14. Central computer 20 can also log the information collected by sensors 16 as well as the amount of time aeration fans 13 operate, the respective backlogs, the climate conditions during aeration fan operation times, and even the grain temperatures associated with the stored grain in the respective storage facilities 10.

Central computer 20 and aeration controllers 14 may operate in a master-slave relationship, in which aeration controllers 14 provide information to central computer 20 in response to requests from central computer 20. Requests for accumulated aeration data may occur periodically, e.g., daily, hourly, or the like. Optionally, system 10 may also support an alarm condition override in which a given controller 14 is able to communicate to central computer 20 without being queried. Such an alarm condition to override the master-slave communication protocol can be effective in alerting central computer 20 of problems or device malfunctions associated with a given storage facility 12.

Central computer 20 can provide improved control and custodial care of the aeration of stored grain. Farmers, or other agricultural producers, cooperatives, or companies may purchase the aeration service at a cost proportionate to the amount of stored grain to be aerated and the duration of storage. In this manner, the purchaser of the aeration service can avoid relatively high fixed costs that can be associated with various aeration hardware such as aeration controller 14. In addition, the seller of the service can control and meter the usage of the grain aeration technology.

Central computer 20 may provide the input parameters to the different aeration controllers 14. The input parameters may include the type of grain, the target temperature, the target moisture content, the size of the temperature and relative humidity bands, the amount and timing of truncation, if desired, the size of the aeration budget, the backlog threshold, and any changes that should occur in response to overcoming the backlog threshold. In some cases, one or more of these input variables may be defined by an operation mode selected for a respective aeration controller 14. In any case, the input variables can be defined differently for various different aeration controllers so as to account for different types of grains, different climates or microclimates, or other variables that may distinguish the operation of aeration fans at different facilities. In some cases, input can be provided in the form of objectives, e.g., desired moisture content and a target delivery date.

The use of central computer 20 to accomplish the programming of input variables and/or mode selection, that would otherwise require onsite attention, can improve aeration significantly and reduce costs associated therewith. In particular, travel to on-site locations can be avoided, training of service persons can be reduced, and a more knowledgeable person operating the central computer 20 can set parameter settings. In some embodiments, the operation of central computer relative to controllers 14 can be automated as well, eliminating human error.

Also, central computer 20 can improve aeration by providing better quality control of the aeration. For example, central computer 20 may facilitate the ability to recognize sensor malfunctions by comparing sensed ambient conditions of one facility 12 to those of another facility in close geographic proximity, e.g., at the same site. Upon identifying possible malfunctions, replacement parts or service may be provided more quickly, which can further improve aeration services.

Central computer 20 may also log the various parameters, settings and measurements accumulated by the respective aeration controller 14. Historical logs may provide a number of advantages. For example, ambient condition sensor data may provide extensive history of weather trends. Accordingly, such information may be useful to weather centers or other agencies concerned with weather prediction and trends. Also, the historical logs may provide useful backup, if for example, a given aeration controller 14 malfunctions or is destroyed. In that case, after a replacement aeration controller is installed, the history of aeration, backlog and other variables needed to continue the aeration in the same manner as prior to the failure can be downloaded to the new aeration controller. Accordingly, historical logs on central computer can improve the robustness of system 10 in the event of a device failure.

Logs stored on central computer 20 may also enable the ability to track and verify the history of a lot of grain. In other words, logs on central computer 20 may be maintained for both aeration controller specific tracking purposes, and also grain specific tracking purposes. If a log of grain is moved from one facility to the next, the grain specific log may track the lot of grain to provide a history of its temperature and moisture content. In that case, a download of information from the central computer 20 which it received from the first aeration controller that originally controlled the grain can be made to the second aeration controller that subsequently controls the grain. Moreover, networked grain aeration system 10 can facilitate this data transfer without requiring on-site attention.

In one implementation of the invention, a chain of custody is automatically documented over time by the networked aeration system and stored in central computer 20. The documentation can even be downloaded, for example, to delivery vehicles, when the stored grain is moved from a given storage facility. The information may be uploaded from the given aeration controller 14 to the delivery vehicle, or downloaded from the central computer 20 to the delivery vehicle. In either case, the central computer 20 can log the current location and track the grain to improve accountability and trace ability.

Purchasers of the grain may desire information describing the history of a particular lot of grain being purchased. By allowing this information to be downloaded from central computer 20, purchasers can be more readily assured of the aeration history and chain of custody of the grain. This data, in turn, can provide a better assurance of safety and quality of the purchased grain. In some cases, grain given the stamp of approval of the aeration service provider may demand a premium price.

Historical tracking and verification of grain can further provide the ability to demand premium prices, for example, for grain that was systematically maintained in only high-quality settings in terms of temperature and relative humidity for the life of the grain. Furthermore, centralized control and robust aeration management may also provide the ability to insure against grain spoilage. For example, with centralized-control and robust monitoring capabilities, the custodian or some other entity may be able to offer grain spoilage insurance to farmers that own the allotments of grain, e.g., on the condition that the grain aeration control services are used. With the ability to define, monitor and update aeration via centralized computer, the custodian can better ensure that spoilage will not occur, and therefore can be better positioned to provide grain spoilage insurance at an affordable price.

One or more client computers 21A and 21B may also be communicatively coupled to the central computer 20, such as via network 18. Using client computers 21A and 21B, farmers or other purchasers of the aeration service may access information relating to their grain and the aeration service provided for that grain. Each individual client computer 21 may have access only to the data that pertains to that particular client, i.e., the purchaser of the service. In other words, a first client computer 21A may not have access to data pertaining to a second agricultural crop storage facility 12N, and likewise the second client computer 21N may not have access to data pertaining to the first agricultural crop storage facility 12A. A password access function may be used to gain access to the data, e.g., via a web browser interface. In addition, more sophisticated security and authentication protocols can be employed.

In some embodiments, customers may be able to select aeration objectives for their grain. For example, using client computer 21, the customer may be able to select a desired moisture content and a desired delivery date. Central computer may receive the user input selecting aeration objectives, and may program the appropriate aeration controller 14 so as to achieve the objectives. If a delivery date is selected, the aeration can be made to occur over time in a manner that achieves the desired moisture content at that delivery date. Also, if a delivery location is defined, the aeration may be defined to purposely dry (wet) the grain in a manner commensurate with an amount of wetting (drying) that would predictably occur during grain delivery. For example, if the grain is to be shipped across the ocean, aeration can be adjusted to purposely dry the grain, knowing that wetting will occur during shipment.

Network 18 may comprise a packet based network such as the Internet, or a smaller public or private packet based network. Alternatively, network 18 may comprise a public switch telephone network (PSTN), or any other network sufficient to transfer information between the aeration controllers 14 and central computer 20 and the various client computers 21 and central computer 20. Various levels of security, such as fire walls or virtual private networks (VPNs), may also be implemented to ensure that information transferred through network 18 is secure.

As mentioned above, various other modifications could also be made to aeration controllers 14 to improve aeration. For example, in accordance with the principles of the invention, one particular variable that could be taken into account by a respective aeration controller 14 is heat produced by the respective aeration fan 13. For example, aeration fans 13 can give off heat from the motor, or more notably, aeration fans 13 may generate significant amounts of heat via friction between the fan blades and the air. In either case, the heat produced by operation of aeration fans 13 may blur the relationship between the ambient temperature measurements by sensors 16 and the actual temperature of air that will be forced into the facility upon activation of an aeration fan 13. Accordingly, an aeration method or algorithm executed by aeration controller 14 may account for heat produced by the aeration fan to yield better aeration results.

In one case, an aeration method executed in aeration controller 14 makes a theoretical adjustment to sensed conditions by accounting for fan size and the size of the grain storage facility. For example, given the fan size and the size of the grain storage facility, a theoretical offset to sensed conditions can be calculated. This offset may be programmed into aeration controller 14, such as via a communication from central computer 20 to the aeration controller 14. In any case, the offset can account for heat produced by the fan, and can be used to more accurately define the actual air temperature or humidity that will be introduced to the storage facility upon operation of the aeration fan 13. In this manner, improved control of the conditions within the grain storage facility can be achieved. The offset may be determined experimentally or mathematically. In either case, the offset may be used to adjust measured ambient temperature to provide a better estimate of the actual temperature of air introduced by aeration fan 13. Moreover, the offset may be used to adjust the target temperature defined by aeration controller 14, e.g., to adjust the twenty-one day moving average of ambient temperature to compensate for the offset caused by heat production of aeration fan 13. Adjusting the target temperature based on heat produced by aeration fan 13 will likewise cause temperature band adjustment in a manner that accounts for heat production of aeration fan 13.

Additionally, a method executed in aeration controller 14 may also account for static pressure within the facility (specifically, for example, at the location of an aeration fan or the entry point of air into the grain). For example, the amount of static pressure may be related to how full the facility is, relative to its capacity. By accounting for static pressure, a better approximation of the offset can be achieved because the heat generated from the friction on the fan blade may be higher if static pressure is higher and may be lower if static pressure is lower.

In one particular case, a feedback sensor, e.g., a feedback node (f-node) described in greater detail below, is used to measure the actual temperature and possibly relative humidity (RH) of air after it has gone through the fan. The f-node may also sense static pressure, if desired. The use of the f-node can achieve an actual measurement of the offset, which can then be used as feedback to the aeration controller 14. The aeration controller 14 can then adjust the operation of the aeration fan 13 accordingly.

Also, modified air-conditions measured by the feedback sensor can be used to define a more useful target temperature and target relative humidity for the bands. In other words, the target temperature and target relative humidity may be adjusted based on feedback measurements of actual conditions within a facility. One or more feedback nodes may be positioned after the aeration fan 13 but prior to the stored grain, e.g., in the plenum. Also, feedback nodes may be positioned in the exhaust of a crop storage facility 12, or in different strata of the grain to provide a number of storage measurements.

System 10 may also be configured to log and record the data of the f-node to provide data demonstrating the actual conditions within the storage facility over time. In other words, the data from an f-node may be logged by central computer 20 for later examination or use. For example, such f-node data could be used as documentation to demonstrate that the grain inside the storage facility was never exposed to conditions favorable or susceptible to the growth of microbes including fungus that can produce mycotoxins, allergens, or other contaminants. This documentation, in turn, could increase the value of the grain and justify the added cost of an f-node sensor. Recording actual conditions inside the storage facility during aeration may also occur in the event of manual override during which an aeration fan is turned on manually on-site. Information defining conditions during manual override may be used later to adjust aeration in order to improve aeration results in terms of achieving a target temperature and moisture content. In this manner, centralized monitoring can improve accountability of the aeration because manual overrides are documented and subsequently used to adjust the aeration, as needed, to achieve the desired temperature and moisture content.

Figure 2:
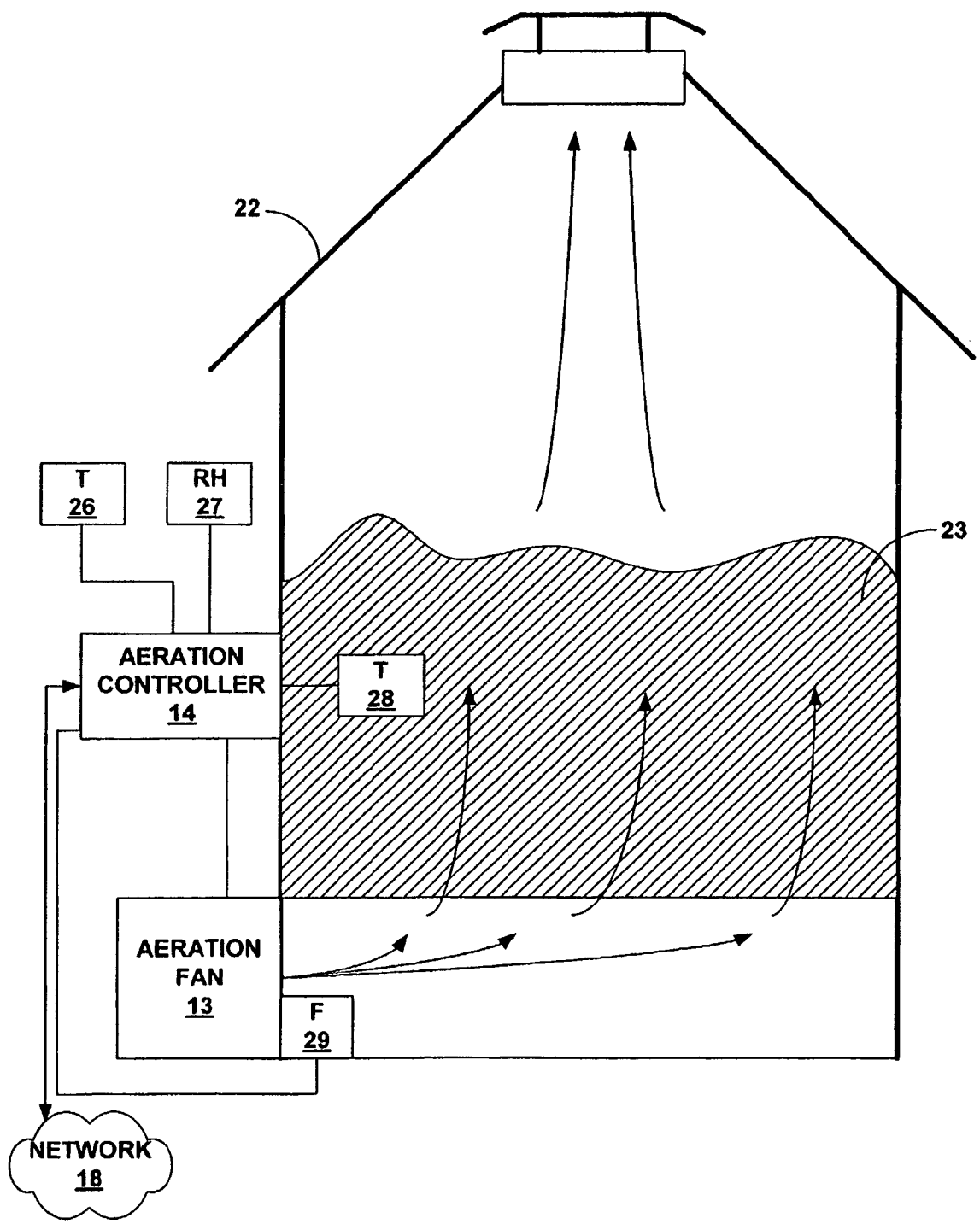
FIG. 2 is a conceptual diagram of an agricultural storage facility making use of a networked grain aeration system.

FIG. 2 is a conceptual diagram of an agricultural storage facility making use of a networked grain aeration system. In this example, the agricultural storage facility comprises a grain bin 22 that stores grain 23. Grain bin 22 is fitted with an aeration fan 13 that is controlled by aeration controller 14. Aeration controller 14 comprises a computer controller that controls operation of aeration fan 13 according to an aeration algorithm such as those described in U.S. Pat. Nos. 4,688,332 or 4,522,335. Additionally, aeration controller 14 may execute more advanced aeration techniques described herein, such as techniques that utilize feedback sensor 29 to further improve the quality of aeration. Also, aeration controller 14 may execute aeration techniques that utilize truncated temperature or relative humidity bands to improve aeration for climate specific scenarios as outlined herein. Furthermore, the truncation feature can be an adaptive feature of aeration controller 14 such that temperature bands or relative humidity bands used to define aeration fan operation times can be adjusted based on previous conditions during which the aeration fan has operated. Heaters, misters, or other grain conditioning devices (not shown) may also be controlled by aeration controller 14.

Aeration controller 14 may be coupled to a computer network 18. In this manner, as outlined above, the sensed information collected by aeration controller 14 and operation of aeration fan 13 can be centrally logged and monitored by a central computer (not shown in FIG. 2). Client computers connected to network 18 may also gain client-specific access to such information.

In operation, temperature sensor 26 measures ambient temperature and provides the measurement of ambient temperature to aeration controller 14. Similarly, relative humidity sensor 27 measures ambient relative humidity and provides the measurement of relative humidity to aeration controller 14. Sensors 26 and 27 may comprise separate components or an integrated sensor that provides sensing functionality for both temperature and relative humidity. Temperature sensor 28 measures the temperature of stored grain 23 and provides the measurement to aeration controller 14. In addition, a barometric pressure sensor may be used by aeration controller 14 to adjust a target relative humidity for a given air temperature. Barometric pressure measurements used to adjust a target relative humidity for a given air temperature can be particularly useful to compensate for elevation of the storage site, relative to sea level.

Aeration controller 14 can be programmed with input specifying a desired temperature and moisture content for the stored grain. Aeration controller 14 may define a temperature band and a relative humidity band respectively around a target temperature and a target relative humidity that corresponds to the desired moisture content for a given temperature. The target temperature may be selected based on a desired temperature, or based on a desired temperature relative to the current temperature of grain 23. In one example, the target temperature is defined by a twenty-one day moving average of ambient temperature. In any case, a temperature band can be defined about the target temperature, and a relative humidity band can be defined about a target relative humidity, which may be temperature dependent. The size of the bands may vary widely in different implementations.

If sensor 26 identifies an ambient temperature within the defined temperature band, say 47 degrees, aeration controller 14 identifies the target relative humidity associated with the 47 degree temperature, say 63 percent. The target relative humidity may be dependent on the current ambient temperature, and may also be dependent on the current temperature of grain 23, e.g., dependent on the ambient temperature relative to the temperature of grain 23. Aeration controller 14 may access a lookup table in memory (not shown) or it may calculate from psychometric formulas to identify the target relative humidity given an ambient temperature and possibly a current grain temperature. In any case, if relative humidity sensor 27 measures a relative humidity within the relative humidity band of the target relative humidity, say 61 percent to 65 percent (+/−2 percent of 63 percent), then aeration controller 14 may activate aeration fan 13. A control node (not shown in FIG. 2) may be used to execute fan activation in response to control signals sent from aeration controller 14.

A feedback sensor 29 may also be used to measure a temperature offset caused by heat production associated with aeration fan 13. Heat from aeration fan 13 may offset the temperature of air introduced to grain bin 22 (as illustrated by the arrows) away from the ambient temperature measured by temperature sensor 26. Accordingly, feedback sensor 29 can be used to provide a more accurate temperature measurement once fan 13 is turned on. The offset measured by feedback sensor 29 can be used to adjust the aeration accordingly. Additionally or alternatively, the measurements of feedback senor 29 may be used to provide actual measurements of temperature and/or relative humidity introduced to grain bin 22. Such information may be logged by central computer 20 (FIG. 1) to provide a more accurate history of the aeration of grain 23.

Alternatively, rather than implement a feedback sensor 29, the heat produced by fan 13 may be accounted for by a theoretical or experimentally determined offset value, which may be used to adjust the measured ambient temperature during execution of the aeration algorithm. In this manner, heat produced by fan 13 may not undermine the effectiveness of aeration. Instead, the temperature band used by aeration controller 14 (as outlined above) may be defined around an ambient temperature measured by temperature sensor 26 plus the theoretical offset. A measurement of static pressure may be used in the generation of the theoretical offset. Additionally, the temperature band, or the relative humidity band may be truncated as described herein to improve aeration for climate specific scenarios.

If desired, additional feedback sensors may also be positioned at various locations of grain bin 22. For example, one or more feedback sensors may be positioned after the aeration fan 13 but prior to the stored grain, e.g., in the plenum. Also, feedback sensors may be positioned in the exhaust of a crop storage facility 12, or in different strata of grain 23 to provide a number of storage measurements.

Aeration controller 14 may also implement a regulator-like mechanism that ensures that the aeration fain 13 can only run for an allotted amount of time, on average, which can conserve power and avoid unnecessary aeration. For example, aeration controller 14 may budget an amount of time for a given time interval, say four hours per day. Aeration controller 14 may also accumulate a backlog of time to account for unused time that was budgeted for aeration. Thus, if the desired conditions were not present for two days, then twelve hours of accumulated budget may be used on the third day. In other words, the four hour budgets for three days may accumulate to twelve hours, which can be used in succession once the desired conditions occur. Once the accumulation of budgeted time is used, aeration fan 13 may be turned off even if the desired ambient conditions are still present.

In addition, aeration controller 14 may define a backlog threshold, say twenty hours (the equivalent of five days at four hours of budget per day). If the backlog exceeds the threshold, aeration controller may enlarge the temperature and/or relative humidity bands to improve the likelihood that aeration will occur. This can help ensure that at least some aeration occurs even if the ambient conditions are sub-optimal.

Also, as described above, aeration controller 14 may implement aeration techniques in which truncation of the temperature and/or relative humidity bands are performed to improve aeration for climate specific scenarios. In particular, aeration controller 14 may truncate the temperature and/or relative humidity bands for different climate scenarios in a manner that causes aeration to achieve improved results in terms of achieving a target temperature and/or moisture content. The truncated band(s) may be predefined for a known climate, or may be adaptively altered by aeration controller 14 based on the actual climate measured during the times when aeration fan 13 operates. In one example, adaptive truncation of a relative humidity band based on actual climate measured during the times when aeration fan 13 has operated may be an advanced operation mode of aeration controller 14, that can be selected or enabled by central computer 20.

Aeration controller 14 may truncate the humidity band for dryer climates, such that for example, if the target relative humidity is 63 percent, then the relative humidity band can be defined to be −1, +3 of that value, i.e., 62 to 66 percent. In other words, the humidity band can be made non-symmetric about the target humidity. Such techniques can greatly improve aeration in extreme climates. Similarly, the truncation feature may also be incorporated to improve aeration in wetter climates. In that case, aeration controller 14 may truncate the humidity band for wetter climates, such that for example, if the target relative humidity is 63 percent, then the relative humidity band can be defined to be −3, +1 of that value, i.e., 60 to 64 percent. Again, the level of truncation may vary in different implementations.

Moreover, as mentioned, the truncation can be an adaptive feature that changes based on measured conditions during operation of aeration fan 13. For example, the relative humidity band may originally be symmetric about a target. In particular, given a target of 63 percent, the relative humidity band can be defined to be −2, +2 of that value, i.e., 61 to 65 percent. Thereafter, if operation of the aeration fan 13 primarily occurs at periods of time during which measured relative humidity is in the dry side of the band, i.e., between 61 and 63 percent, then aeration controller may adaptively truncate the humidity band to enlarge the wet side of the band and decrease the dry side of the band.

In other words, if aeration controller 14 can determine that operation of the aeration fan 13 has primarily occurred at periods of time during which measured relative humidity is in the dry side of the band. In that case, aeration controller 14 can modify the band to favor operation during wetter periods of time, e.g., the band can be adaptively changed to be −1, +3 of the 63 percent target, i.e., 62 to 66 percent. Aeration controller 14 may continue to modify and adaptively alter the bands as aeration occurs in different weather. In some cases, the relative humidity band may be originally defined symmetrically about the target relative humidity, then truncated to the wet side after fan operation in dry conditions, then re-established in a symmetric band after the truncation compensates for the previous dry conditions, and then possibly truncated to the wet side, e.g., if subsequent fan operation occurs during extended wet conditions.

In this manner, adaptive truncation of the relative humidity band can achieve improved results in terms of achieving a target moisture content for the stored grain. In other words, adaptive truncation of climate bands can cause grain can be aerated in a manner that improves the ability to achieve desired grain conditions. Threshold values for climate parameters defined during operation of the aeration fan 13 can be used to define when such adaptive truncation should occur, and are subject to a wide variety of implementations.

Moreover, centralized control and monitoring of grain aeration can also improve the level of aeration quality, allowing the provider of the aeration service to centrally monitor whether the individual aeration controllers 14 are working properly. Another advantage of networked grain aeration includes the ability to provide more effective aeration control among various grain storage units. In other words, instead of a local grain storage manager controlling aeration as he or she sees fit, central expertise can be used to monitor and more effectively control aeration.

Networked grain aeration may also allow for a new and inventive pricing arrangement that can be attractive to prospective purchasers. In particular, fees may be charged in amounts commensurate to an amount of grain being stored in any given agricultural crop storage facility. The duration of storage can also be reflected in the price. Such a pricing scheme can reduce fixed costs to individual farmers and improve the likelihood of industry acceptance of such services. Such a pricing scheme may also overcome a "free-rider" problem, wherein a purchaser of an aeration unit for a small storage facility uses the aeration unit in a much larger facility or for multiple facilities.

The results achieved by a free-rider may not be particularly great aeration results, but they may be nevertheless better aeration results than would be achieved with no aeration control. Still, because the free-rider often makes use of improperly sized aeration fans in oversized storage facilities, free-riders may undermine consumer confidence in an aeration control product or service. In other words, prospective customers may view the results achieved by free-riders as inadequate and correlate inadequacy with the seller of the product. In fact, however, the free-riders may not be achieving the most effective results. Thus, avoiding the free-rider problem may improve good will associated with the seller of the aeration product or service, in addition to forcing the free-rider to bear a more proportionate cost.

Centralized monitoring of aeration may also allow the selling of grain spoilage insurance for an amount of grain being stored in any given agricultural crop storage facility. In other words, networked grain aeration can facilitate the ability to guarantee against grain spoilage. Farmers may be able to take out loans from a bank, based on the amount of harvested crops that the farmer owns but has not yet sold, but such loans may be conditioned on the purchase of spoilage insurance. The seller of aeration services, utilizing networked grain aeration having centralized control, may be able to provide this insurance because the centralized control allows the seller of the service to adequately manage against grain spoilage. In particular, the use of networked grain aeration can reduce insurance premiums to an affordable level.

Figure 3:
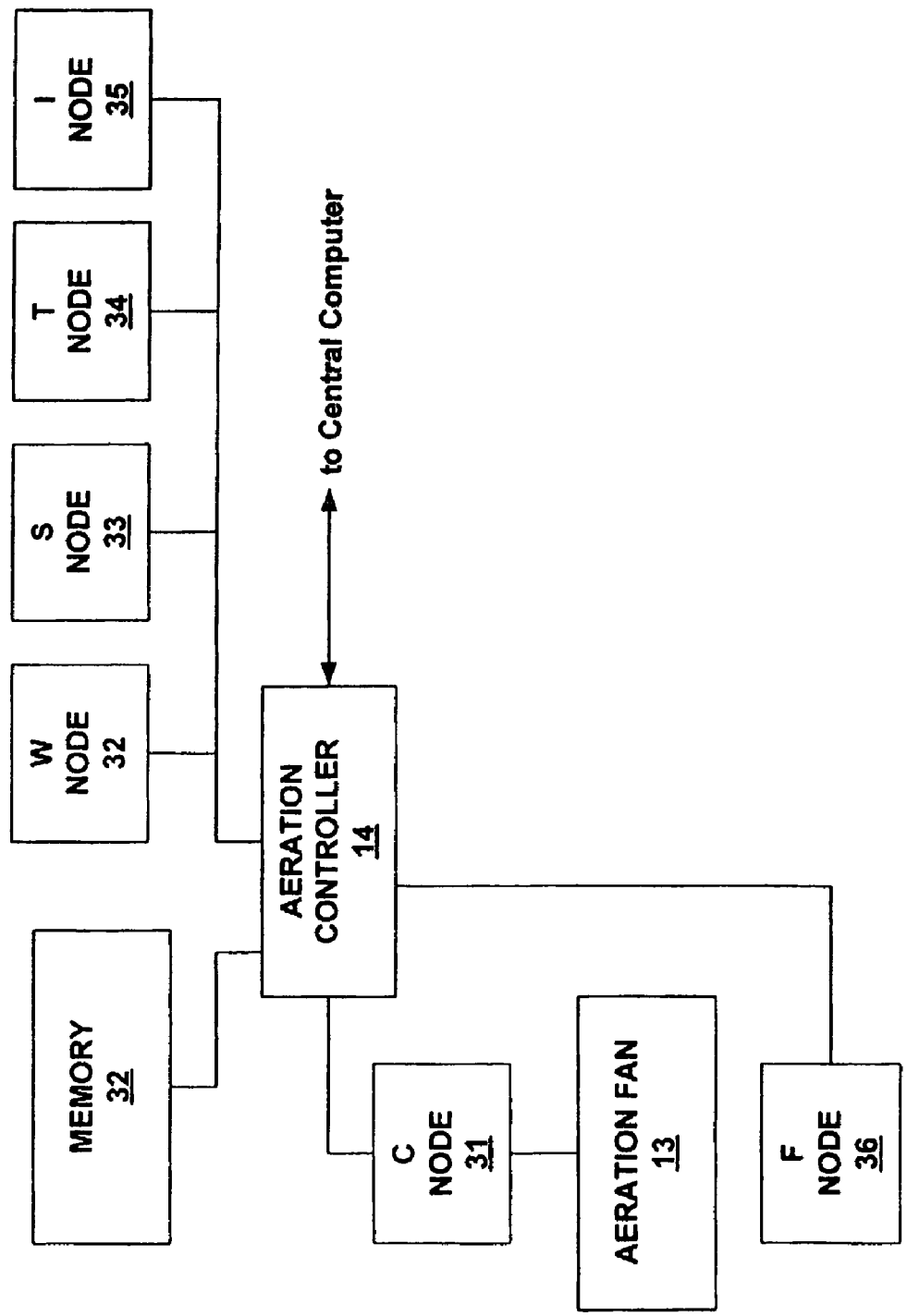
FIG. 3 is an exemplary block diagram of one embodiment of grain aeration system that can be installed in at a storage facility.

FIG. 3 is an exemplary block diagram of one embodiment of grain aeration system that can be installed in at a storage facility. As illustrated aeration controller 14 can be communicatively coupled to a central computer. In any case, aeration controller 14 controls operation of aeration fan 13, and possibly other grain management tools such as heaters, misters, or the like, based on sensed conditions.

Aeration controller 14 may also be coupled to a memory device 32,which can be used to store programmed aeration parameters, recent aeration data prior to transmission to central computer 20, look-up tables, and possibly computer readable instructions (software) that can be executed by aeration controller 14 to perform the aeration techniques described herein. Memory 32 may also store programmable identification numbers associated with aeration controller 14 and its various nodes. An indication of storage capacity and current usage may also be stored.

If desired, aeration controller 14 may also be coupled to a user interface (not shown) to provide on-site control and programming capabilities. The user interface may be used by on-site personal to access local aeration data, operational parameters, operational modes, and the like. The user interface may also be used to manually override centralized control, for example, to turn on the aeration fan. Such manual overrides, however, can be reported to central computer 20 so that future aeration can account for and possibly adjust aeration because of the manual override. The user interface may take the form of a browser application executing in a microprocessor, such as deployed in a laptop computer or a personal digital assistant (PDA) with wireless communication capabilities. The user interface can be programmed to issue commands to controller 14.

As shown in FIG. 3, aeration controller 14 is coupled to one or more nodes, such as, for example, c-node 31, w-node 32, s-node 33, t-node 34, i-node 35, and f-node 36. The nodes correspond to various sensors, switches, or other units used by aeration controller 14 during aeration. Aeration controller 14 and respective nodes 31-36 may operate according to a master slave relationship in which aeration controller 14 polls nodes 31-36 to obtain sensed information, and instructs nodes 31-36, for example, when activation of aeration fan 13 should occur.

C-node 31 may correspond to an on/off relay switch used to turn aeration fan 13 on and off. Similar nodes may also be used for heaters, misters, or the like. C-node 31 may also have a static pressure gauge sensor. In any case, c-node 31 can be used to switch aeration fan 13 on and off, at appropriate times identified by aeration controller 14. For example, aeration controller 14 may issue control signals to the c-node to cause aeration fan 13 to be switched on or off.

W-node 32 may be a weather node used to sense one or more ambient conditions surrounding the given storage facility. For example, w-node 32 may include temperature sensor, a relative humidity sensor, a barometric pressure sensor, a rain gauge, a global positioning system (GPS) module, and possibly a wind speed/direction sensor.

F-node 36 may include a temperature sensor and a relative humidity sensor. F-node 36 may be used to provide feedback to aeration controller 14 as outlined above. By way of example, one or more f-nodes may be positioned after the aeration fan 13 but prior to the stored grain, e.g., in the plenum. Also, one or more f-nodes may be positioned in the exhaust of a crop storage facility 12, or in different strata of the grain to provide a number of grain storage measurements.

T-node 34 may provide an interface to an external thermocouple module, which can be used to measure temperatures within a grain storage bin. In other words, T-node 34 may correspond to a temperature sensor positioned to measure the current temperature of stored grain. T-node 34 may or may not also include a relative humidity sensor.

S-node 33 may provide an interface to an external electronic scale module, used to weigh shipments of grain as they are brought in for storage. Accordingly, s-node can be used by aeration controller 14 to identify the amount of grain storage in the given storage facility. As mentioned, memory 32 may store both an indication of storage capacity and current storage usage. Such information may be determined by s-node 33. The amount of grain being aerated may affect pricing, in accordance with one or more of the pricing schemes described herein.

I-node 35 may provide current metering capability by using a current transformer and rectifier circuit. Thus, i-node 35 can be used to measure electricity use, and to document information related to electricity use. Such information may be stored locally by aeration controller and then transferred to central computer 20. Power suppliers may desire collective estimations of electricity usage associated with a number of facilities that use the aeration systems. In this manner, power usage of the fans controlled by the networked grain aeration system may merit special rates. If electricity supplied to a grain storage site is subject to demand charges, the controllers may rotate fan usage so as to avoid these demand charges.

Figure 4:
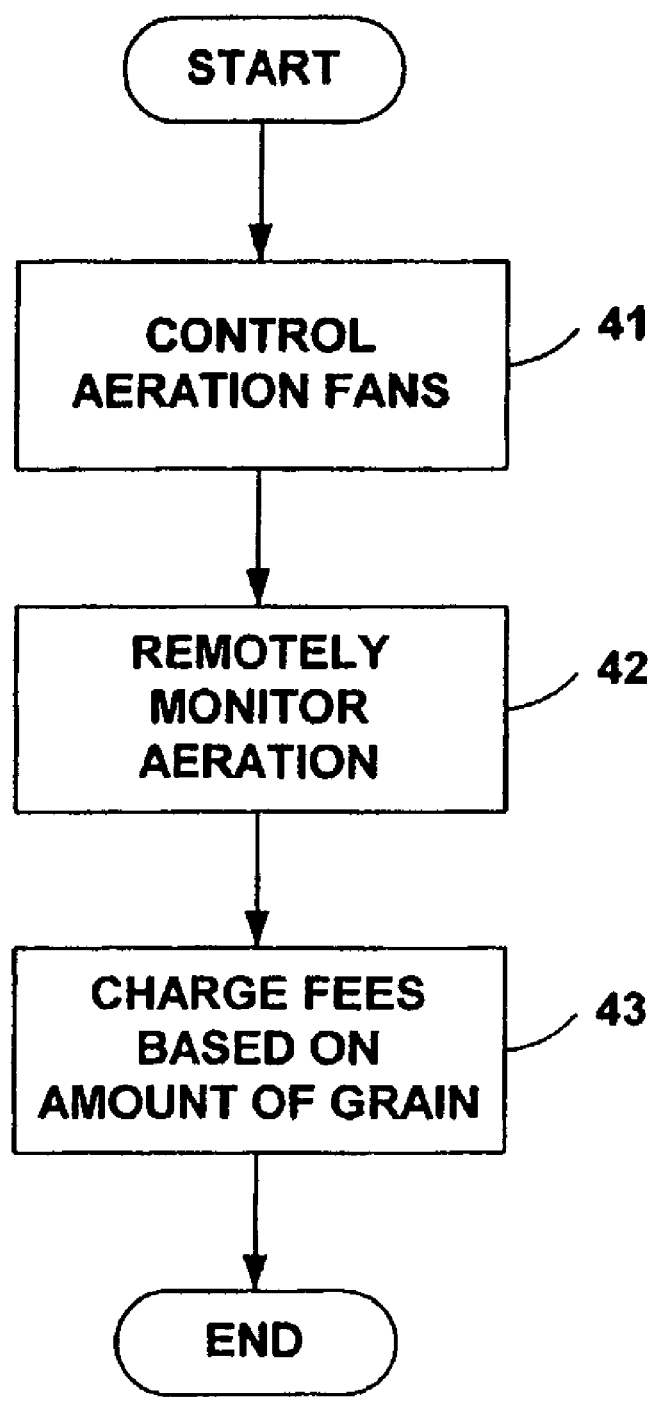
FIGS. 4-12 are flow diagrams illustrating techniques according to various embodiments of the invention.

FIG. 4 is a flow diagram according to one embodiment of the invention. As shown, aeration controllers 14 are used to control aeration fans according to sensed conditions (41). Moreover, a central computer 20 can be communicatively coupled to the aeration controllers 14 to monitor aeration (42). The custodian of the service can charge fees to customers based on the amount of grain being aerated and the duration of the storage (43). In this manner, customers may be more accepting of the aeration service because fixed costs associated with aeration hardware can be eliminated as a fixed expense to the customer.

Figure 5:
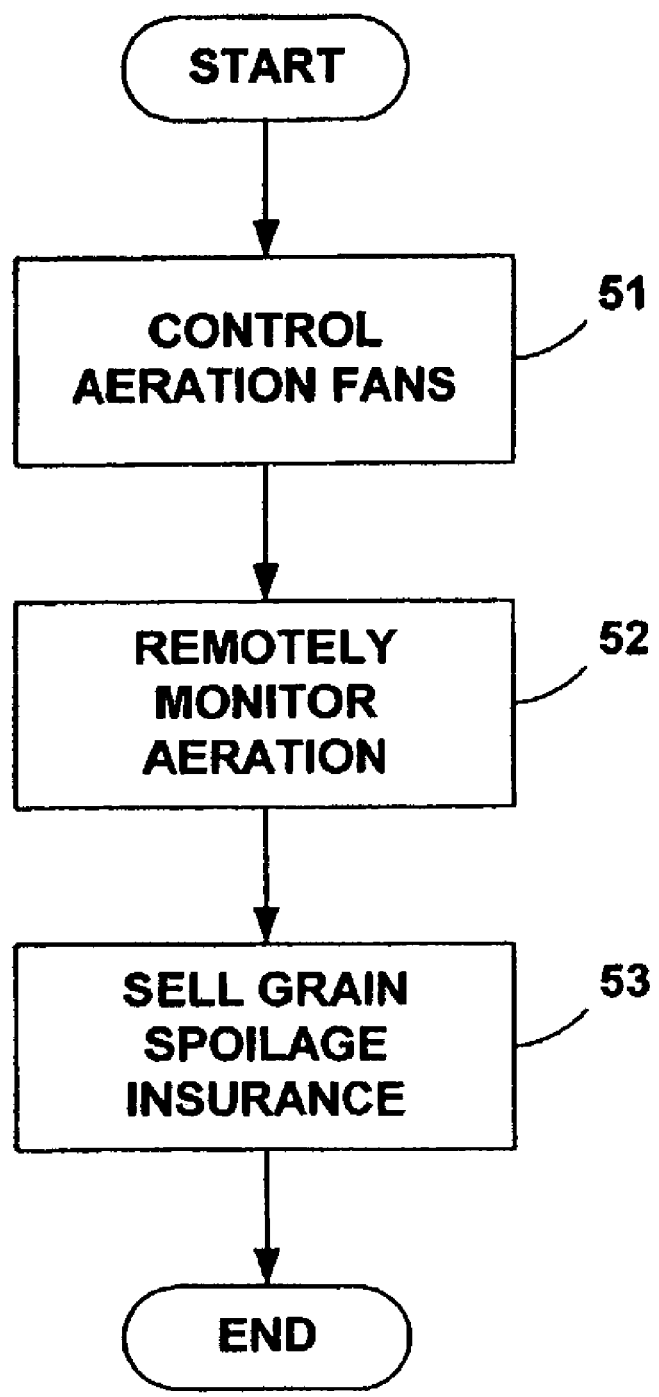

FIG. 5 is another flow diagram according to one embodiment of the invention. Again, aeration controllers 14 are used to control aeration fans according to sensed conditions (51), and a central computer 20 can be communicatively coupled to the aeration controllers 14 to remotely monitor aeration (52). The custodian of the service can sell grain spoilage insurance (53) because the centralized control allows for the control needed to ensure against spoilage. In particular, centralized control of aeration can help keep premiums affordable, e.g., based on the condition that the aeration service is used.

Figure 6:
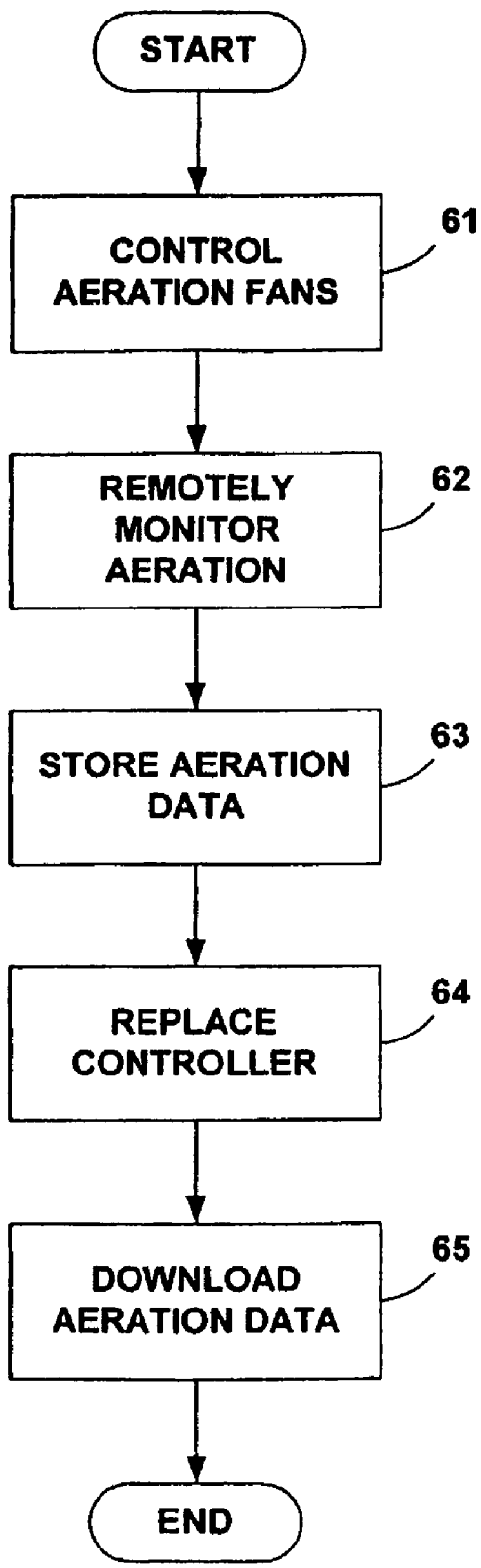

FIG. 6 is another flow diagram according to one embodiment of the invention. Again, aeration controllers 14 are used to control aeration fans according to sensed conditions (61), and a central computer 20 can be communicatively coupled to the aeration controllers 14 to remotely monitor aeration (62). Central computer 20 can store aeration data (63), such as data pertaining to aeration fan operation, ambient conditions (or f-node conditions) during aeration, and various operational parameters associated with the aeration controllers 14. Accordingly, if an aeration controller 14 fails and is replaced (64), the aeration data can be downloaded to the new aeration controller (65) to ensure that aeration will continue in a manner consistent with that prior to the failure.

Figure 7:
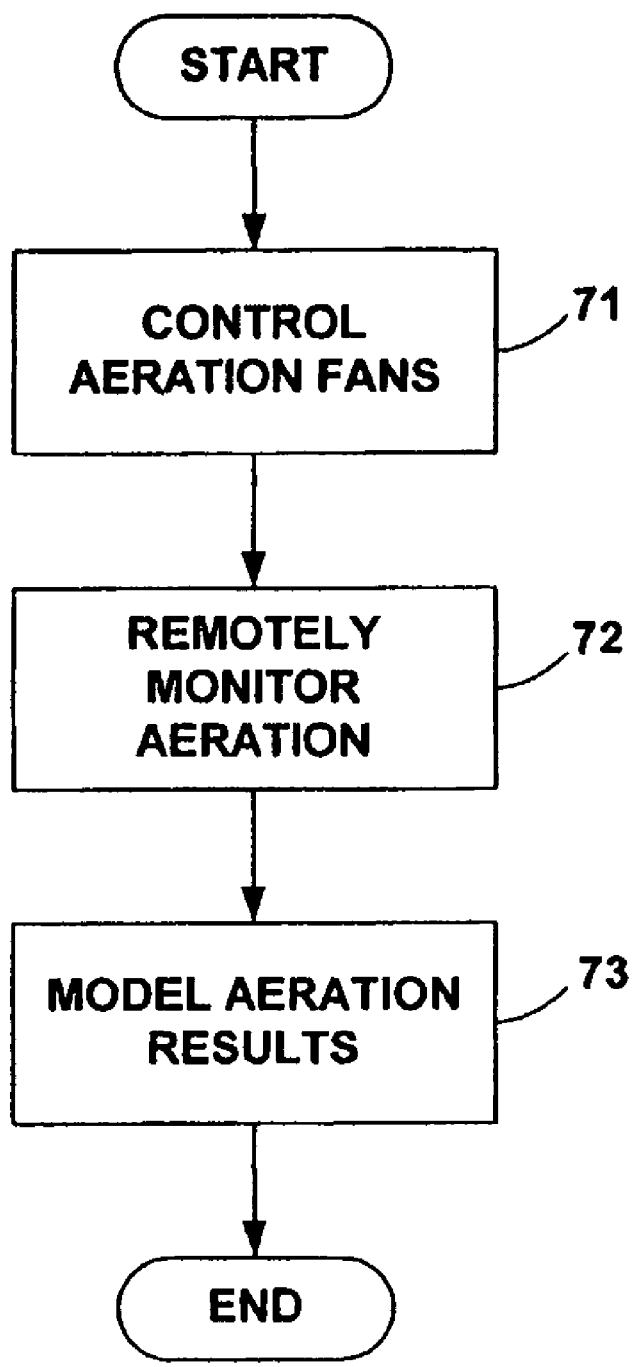

FIG. 7 is another flow diagram according to one embodiment of the invention. Again, aeration controllers 14 are used to control aeration fans according to sensed conditions (71), and a central computer 20 can be communicatively coupled to the aeration controllers 14 to remotely monitor aeration (72). Predictable aeration results can be modeled for prospective customers to identify to the prospective customer, the value of the system (73).

Figure 8:
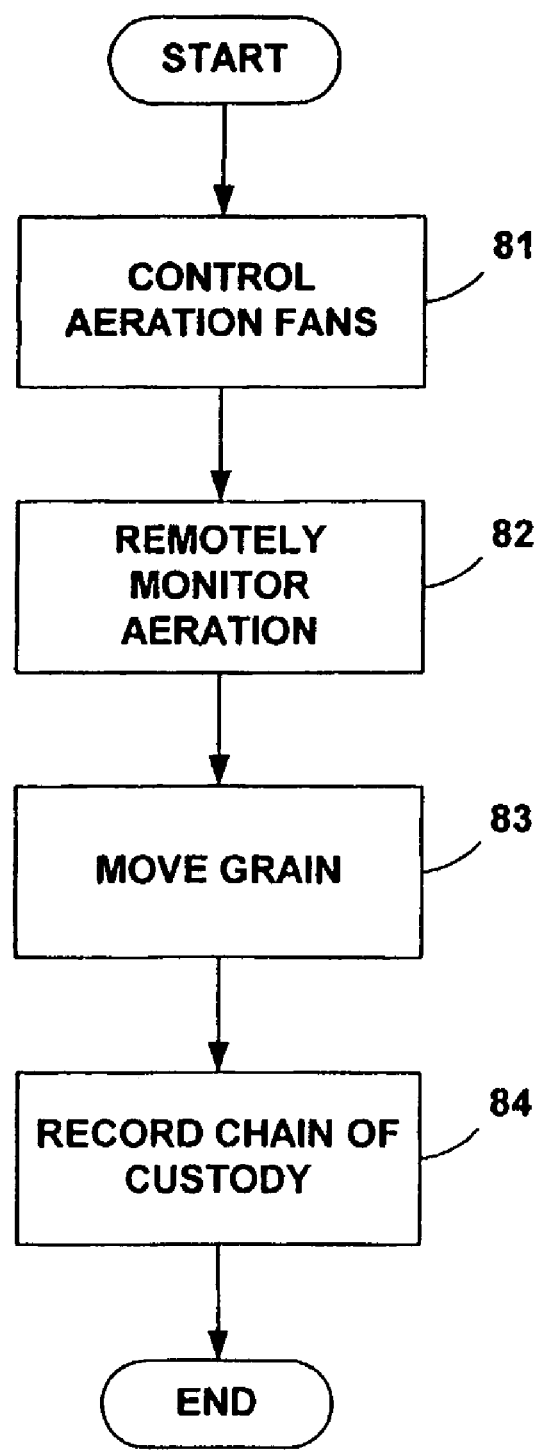

FIG. 8 is another flow diagram according to one embodiment of the invention. Again, aeration controllers 14 are used to control aeration fans according to sensed conditions (81), and a central computer 20 can be communicatively coupled to the aeration controllers 14 to remotely monitor aeration (82). As grain is moved (83), a chain of custody can also be recorded (84) to provide quality assurances to prospective grain purchasers. Such assurances can result in premium prices for the documented grain.

Figure 9:
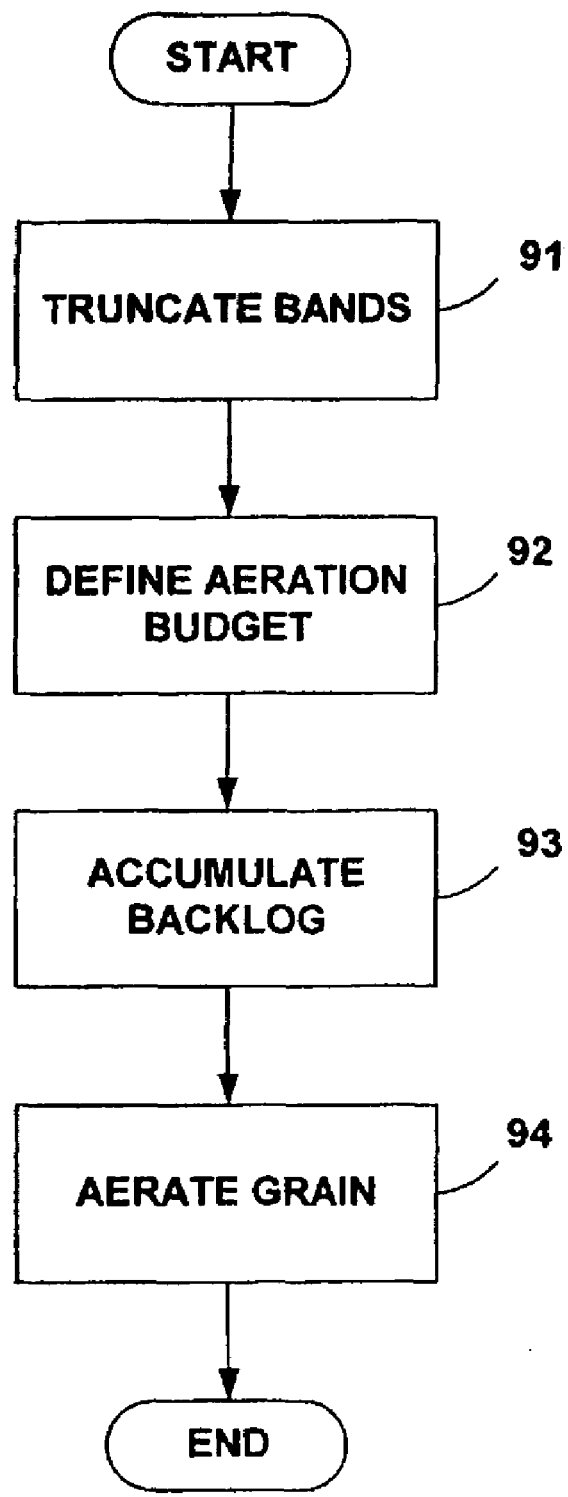

FIG. 9 is a flow diagram illustrating an aeration technique that may be used as part of a networked grain aeration system or a more conventional non-networked grain aeration unit. As shown, aeration controller 14 defines truncated temperature and/or relative humidity bands in order to improve aeration for extreme climate scenarios (91). Aeration controller 14 may also define an aeration budget (92), and accumulate a backlog when budgeted aeration time is not used. Eventually, when the ambient conditions fall within the truncated bands, aeration controller 14 can activate aeration fan 13 in order to aerate the grain (94). Importantly, the truncation of the temperature and/or humidity bands can result in aeration that attains improved aeration results in terms of achieving a target temperature and/or target moisture content.

Figure 10:
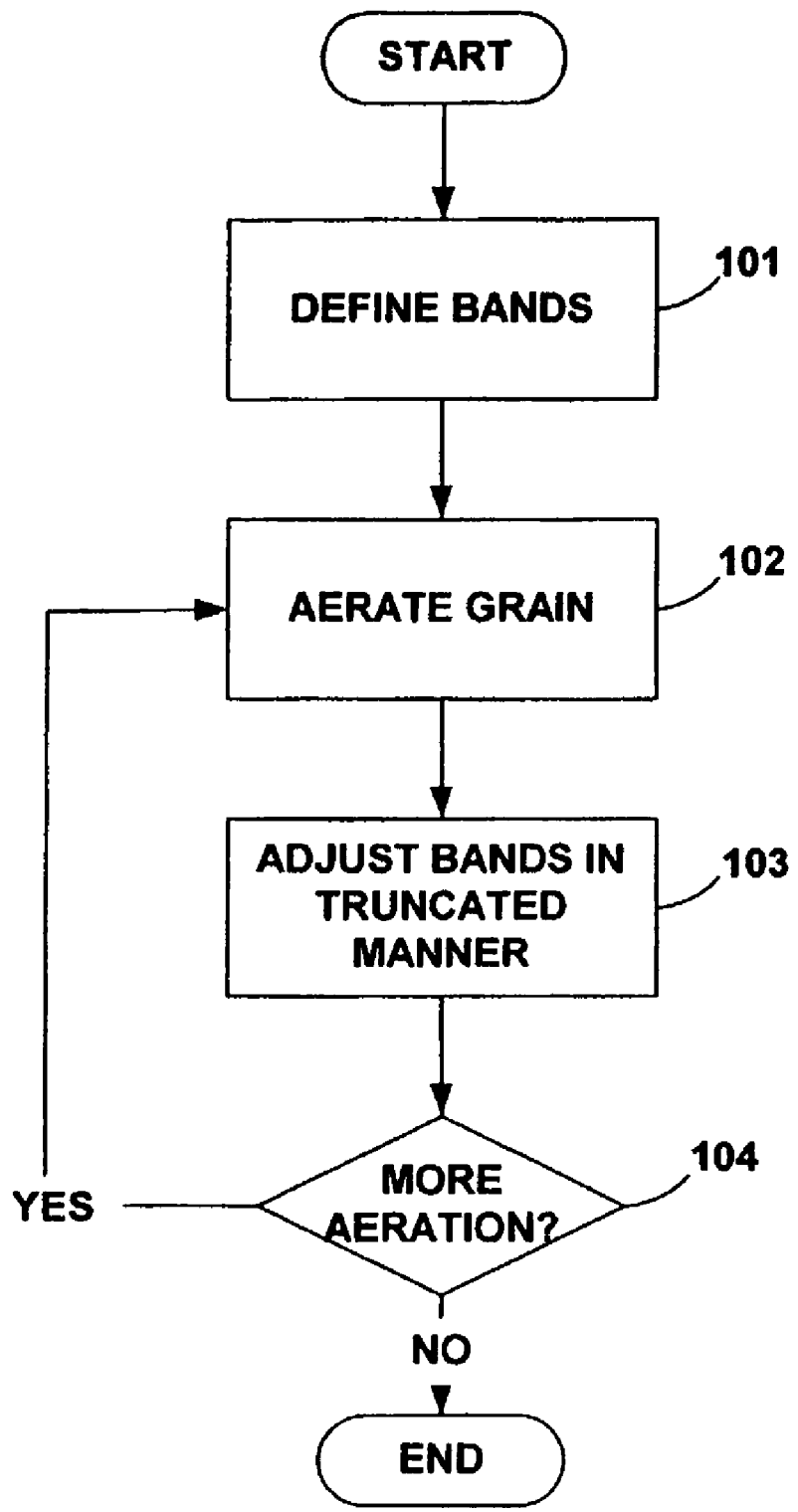

FIG. 10 is another flow diagram according to one embodiment of the invention. As shown aeration controller 14 defines climate bands such as a temperature band and a relative humidity band (101). For example, the bands may be programmed about target values, or may be defined about a target determined as a function of current grain temperature. The relative humidity band may be temperature dependent, and may further be dependent on the temperature of the stored grain relative to ambient temperature.

Aeration controller 14 causes aeration fan 13 to aerate the grain when the local conditions fall inside the defined climate bands (102). Moreover, aeration controller 14 thereafter adaptively adjusts one or more of the climate bands in a truncated manner (103). In other words, if aeration has primarily occurred for more than a defined amount of time during wet conditions, e.g., conditions falling on the wetter side of the relative humidity band, aeration controller 14 can truncate the relative humidity band to the dry side. Similarly, if aeration has primarily occurred for more than a defined amount of time during dry conditions, e.g., conditions falling on the dryer side of the relative humidity band, aeration controller can truncate the relative humidity band to the wet side.

Then, when more aeration is desired (yes branch of 104), aeration controller 14 causes aeration fan 13 to aerate the grain when the local conditions fall inside the truncated climate bands (102). In this manner, truncation of the climate bands, including the relative humidity band or the temperature band can be an adaptive feature of aeration controller 14 that improves the ability to achieve a target temperature and/or moisture content for the stored grain. Adaptive truncation of climate bands during aeration may be enabled on aeration controller 14 by selecting a specific operation mode that corresponds to the truncation feature. Moreover, mode selection can be made offsite at central computer 20, if a networked grain aeration control system is employed.

Figure 11:
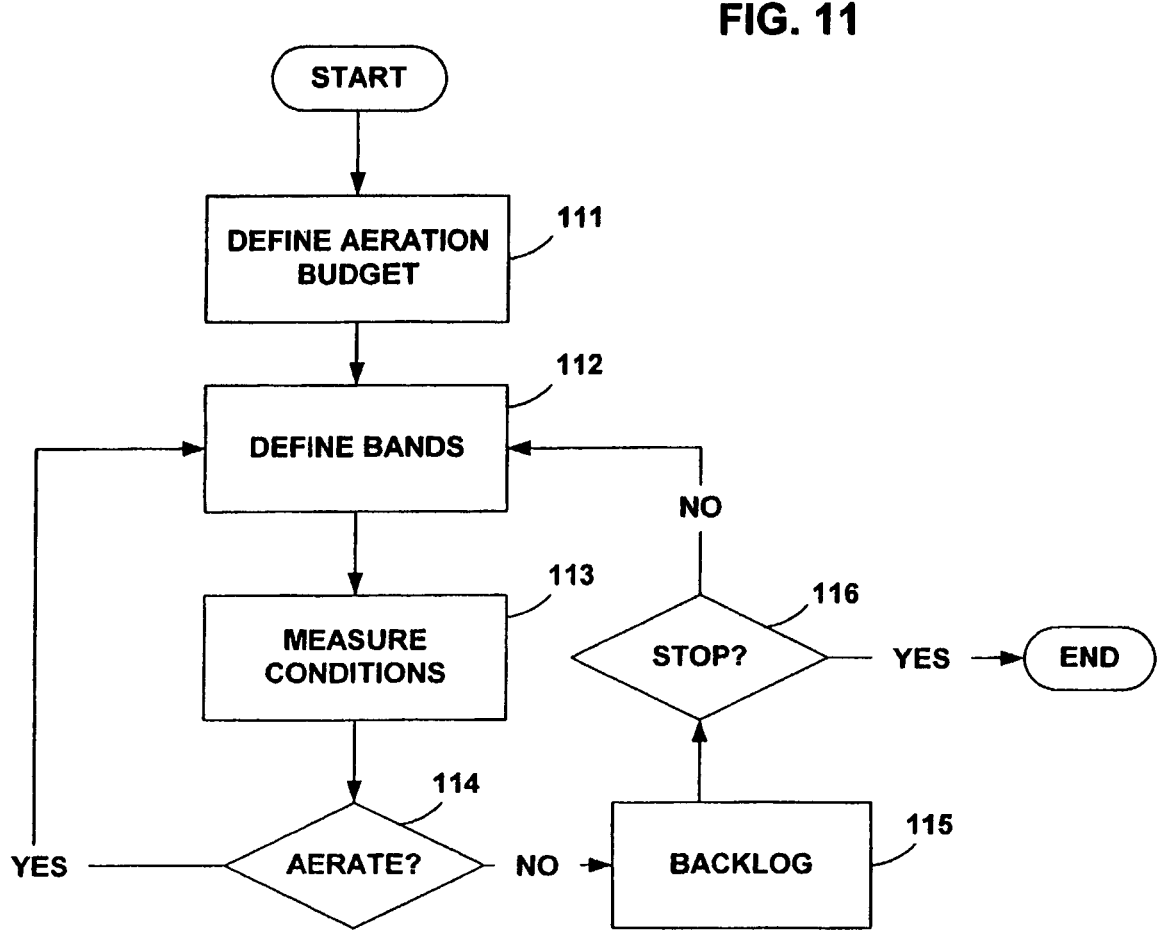

FIG. 11 is another flow diagram according to one embodiment of the invention. As shown aeration controller 14 defines an aeration budget (111). For example, the budget may be a programmed value or input provided to aeration controller 14 that defines the maximum amount of operation time of aeration fan 13 per unit time, e.g., four hours per day.

Aeration controller 14 also defines climate bands such as a temperature band and a relative humidity band (112). Again, the bands may be programmed about target values, or may be defined about a target determined as a function of current grain temperature. The relative humidity band may be temperature dependent, and may further be dependent on the temperature of the stored grain relative to ambient temperature.

One or more sensors 16 such as those described above measure the conditions surrounding the storage facility 12 (113). Aeration controller 14 polls the sensors 16 to obtain sensed data, and makes a determination whether to aerate the grain based on the sensed conditions (114). In particular, to perform aeration (yes branch of 114), aeration controller 14 causes aeration fan 13 to aerate the grain, such as by invoking a control node (c-node) to switch aeration fan 13 on.

If aeration does not occur (no branch of 114), then the unused portion of the aeration budget is backlogged (1 15). For example aeration may be regulated by aeration controller 14 such that aeration occurs only when there is remaining aeration budget unused in the backlog. In other words, if four hours per day are allocated, then four hours can be used each day. If some time is unused in a given day, that time is backlogged so that it can be used during subsequent days when the desired conditions are present. Thus, if aeration does not occur on the first day, but does occur on the second day, eight hours of aeration may occur in succession on the second day, i.e., four hours of budget for the second day plus four hours of backlog from the first day.

Furthermore, when more aeration is desired (no branch of 116), aeration controller 14 may redefine the bands, such as by adaptively truncating the bands as described above. Aeration may be stopped (yes branch of 116) by manually overriding aeration controller 14. For example, once the grain is sold and removed from facility 12, the aeration controller 14 may be powered down or otherwise disabled.

Figure 12:
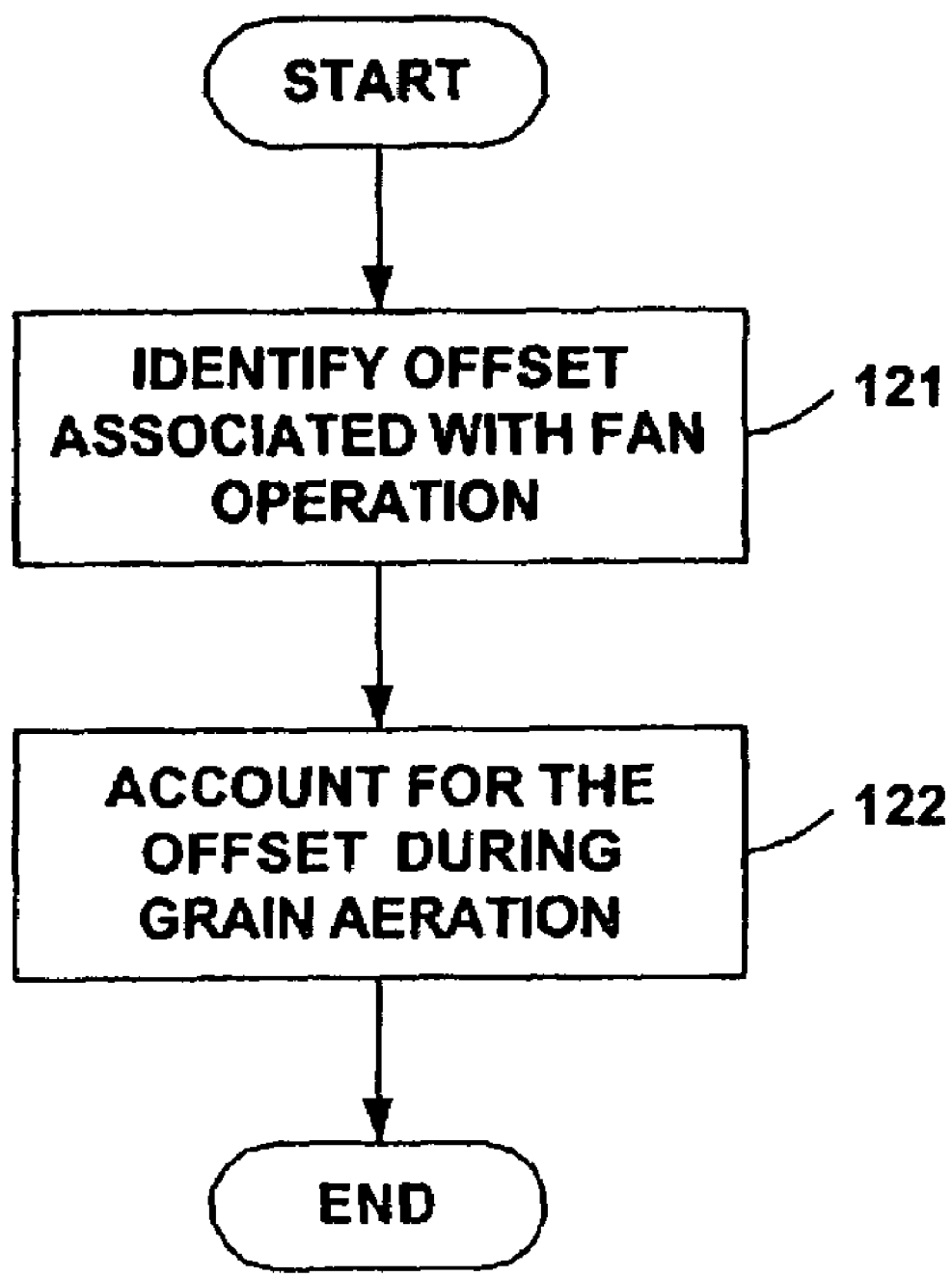

FIG. 12 is another flow diagram according to one embodiment of the invention. As shown, aeration controller identifies an offset associated with operation of aeration fan 13 (121). For example, the offset may be identified by a programmed theoretical offset value, or may be measured by a feed back sensor 29. In either case, aeration controller 14 accounts for the offset during grain aeration (122). In this manner, changes to the air introduced by aeration fan 13 from the sensed ambient conditions, such as a slight temperature increase, will not reduce the effectiveness of aeration. Instead, the offset can be used by aeration controller 14 to adjust operation of the aeration fan 13 accordingly to account for heat production or other effects caused by the operation of aeration fan 13.

Aeration is an important part of modem agricultural management. In particular, aeration can be effective in avoiding spoilage of grain, preserving grain weight, minimizing insect infestation, improving moisture content, rehydrating grain, avoiding cracking of kernels, reducing stress cracks, and generally preserving and possibly improving the quality of stored grains. The techniques described herein can improve grain aeration and the aeration service.

Many implementations and embodiments of the invention have been described. For instance, may different features of a networked grain aeration system have been described. In addition other features and methods have been described which may be used in a networked grain aeration system, or a more conventional non-networked aeration control system. Nevertheless, it is understood that various modifications can be made without departing from the spirit and scope of the invention. For example, the invention may use only some of the many features described above. Furthermore, other nodes are envisioned, including nodes that measure barometric pressure or other ambient conditions. Moreover, some techniques, such as truncating the relative humidity and/or temperature bands based on climate may be implemented in non-networked systems. Accordingly, other implementations and embodiments are within the scope of the following claims.

The invention claimed is:

1. A crop storage system for determining fees associated with management of remote crop storage facilities, the system comprising:
   an operator interface in communication with a central computer, wherein the operator interface is configured to transmit crop storage data from a remote crop storage facility to the central computer;
   a central computer for managing storage of a crop within the crop storage facility; wherein the central computer is in communication with the operator interface, and wherein the central computer determines management fees by:
     receiving crop storage data of the crop from the remote crop storage facility;
     evaluating the received storage data of the crop to determine a management fee; and
     communicating the determined management fee to the remote crop storage facility.

2. The system of claim 1, wherein the crop storage data includes the amount of grain stored in the remote crop storage facility.

3. The system of claim 1, wherein the crop storage data includes the storage duration of grain stored in the remote crop storage facility.

4. The system of claim 1, wherein the central computer communicates the determined management fees to an operator interface through a network.

5. The system of claim 1, wherein the operator interface transmits crop storage data to the central computer through a network.

6. The system of claim 1, wherein the operator interface includes restricted access to the central computer, wherein the restricted access prohibits the operator interface from evaluating the received storage data to determine the management fee.

7. A computer-implemented method for charging management fees to remote crop storage facilities, the method comprising:
   providing communication between a crop storage facility, an operator interface, and a central computer separate from the crop storage facility, wherein the central computer provides a management service to manage crops stored within the crop storage facility;
   transmitting crop storage data of the crop from the crop storage facility to the central computer, wherein the crop storage data is associated with the management service;
   evaluating the received crop storage data of the crop on the central computer to determine a management fee for the management service.

8. The computer-implemented method of claim 7, wherein the crop storage data includes the amount of grain stored in the crop storage facility.

9. The computer-implemented method of claim 7, wherein the crop storage data includes the storage duration of grain stored in the remote crop storage facility.

10. The computer-implemented method of claim 7, wherein the central computer communicates the determined management fees to the operator interface.

11. The computer-implemented method of claim 10, wherein the central computer communicates through a network.

12. The computer-implemented method of claim 7, wherein the operator interface transmits crop storage data to the central computer through a network.

13. The computer-implemented method of claim 7, wherein the operator interface includes restricted access to the central computer, wherein the restricted access prohibits the operator interface from evaluating the received storage data.

14. The computer-implemented method of claim 7, wherein the central computer communicates the determined management fees to the operator interface, wherein the operator interface includes access to the determined management fees and other operator interfaces associated with the central computer are restricted from accessing the determined management fees.

15. A computer-readable storage medium having computer executable instructions for charging management fees to remote crop storage facilities, the instructions comprising:
   receiving, through a network, crop storage data associated with management of a crop in a remote crop storage facility;
   evaluating the crop storage data associated with the management of the crop in the remote crop storage facility to determine a fee to charge the remote crop storage facility; and
   generating a fee notification.

16. The computer-readable storage medium of claim 15, wherein the crop storage data includes the amount of grain stored in the remote crop storage facility.

17. The computer-readable storage medium of claim 15, wherein the crop storage data includes the storage duration of the grain stored in the remote crop storage facility.

18. The computer-readable storage medium of claim 15, wherein receiving crop storage data includes receiving crop storage data through a secure network according to an access level.

19. The computer-readable storage medium of claim 15, further comprising sending the fee notification through a network.

20. The computer-readable storage medium of claim 19, wherein sending the fee notification includes sending the fee notification through a network according to an access level.

* * * * *

UNITED STATES PATENT AND TRADEMARK OFFICE
CERTIFICATE OF CORRECTION

| | | |
|---|---|---|
| PATENT NO. | : 7,240,029 B2 | Page 1 of 1 |
| APPLICATION NO. | : 11/303518 | |
| DATED | : July 3, 2007 | |
| INVENTOR(S) | : Daniel Kallestad | |

It is certified that error appears in the above-identified patent and that said Letters Patent is hereby corrected as shown below:

The Title page of the patent should reflect the following Related U.S. Application Data:

"This patent is a divisional of application Serial No. 10/217,312 filed August 8, 2002, which issued as U.S. Patent No. 7,004,401 on February 28, 2006, which claims the benefit of U.S. Provisional Application No. 60/311,752 filed August 10, 2001."

Signed and Sealed this

Seventeenth Day of May, 2011

David J. Kappos
*Director of the United States Patent and Trademark Office*